US008403473B2

(12) United States Patent
Irita

(10) Patent No.: US 8,403,473 B2
(45) Date of Patent: Mar. 26, 2013

(54) INKJET RECORDING METHOD AND INKJET PRINT

(75) Inventor: Kiyoshi Irita, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 259 days.

(21) Appl. No.: 12/749,521

(22) Filed: Mar. 30, 2010

(65) Prior Publication Data

US 2010/0253735 A1 Oct. 7, 2010

(30) Foreign Application Priority Data

Apr. 1, 2009 (JP) ................................ 2009-088819

(51) Int. Cl.
*G01D 11/00* (2006.01)

(52) U.S. Cl. .............. 347/96; 347/95; 347/98; 347/100; 106/31.6

(58) Field of Classification Search ............ 347/95–100, 347/102; 523/160, 161; 106/31.13, 31.6
See application file for complete search history.

(56) References Cited

U.S. PATENT DOCUMENTS 6,027,210 A * 2/2000 Kurabayashi et al. ........ 347/100
6,426,375 B1 * 7/2002 Kubota ........................ 523/160
8,105,650 B2 * 1/2012 Yanagi et al. ................ 427/265
2006/0125895 A1 * 6/2006 Nito et al. .................... 347/100
2007/0263054 A1 * 11/2007 Yatake et al. ................ 347/100
2009/0079784 A1 * 3/2009 Chiwata et al. ................ 347/21
2009/0130312 A1 * 5/2009 Ono et al. .................... 427/288
2010/0075052 A1 * 3/2010 Irita ............................ 427/288
2010/0080913 A1 * 4/2010 Irita ............................ 427/258
2010/0259578 A1 * 10/2010 Irita et al. .................... 347/21

FOREIGN PATENT DOCUMENTS

JP 2004-10633 A 1/2004
JP 2007-99913 A 4/2007

* cited by examiner

*Primary Examiner* — Matthew Luu
*Assistant Examiner* — Rut Patel
(74) *Attorney, Agent, or Firm* — SOLARIS Intellectual Property Group, PLLC

(57) ABSTRACT

An inkjet recording method includes: a treatment liquid application process in which a treatment liquid containing an acidic compound is coated on a recording medium by roller coating at a coating speed of 300 mm/sec or higher; and an ink application process in which an ink composition containing self-dispersing polymer particles having an acid value of from 30 mgKOH/g to 80 mgKOH/g, a pigment, and an aqueous medium is ejected, by an inkjet process, onto the recording medium coated with the treatment liquid to record an image.

11 Claims, No Drawings

INKJET RECORDING METHOD AND INKJET PRINT

CROSS-REFERENCE TO RELATED APPLICATION

This application is based on and claims priority under 35 USC 119 from Japanese patent Application No. 2009-088819 filed on Apr. 1, 2009, the disclosure of which is incorporated by reference herein.

BACKGROUND OF THE INVENTION

1. Field of the Invention

The present invention relates to an inkjet recording method and an inkjet print.

2. Description of Related Art

Various image recording methods for recording color images have been proposed in recent years. In every method, it is requested that the obtained prints have high quality with respect to, for example, image quality, texture, and suppression of curl after recording.

For example, inkjet techniques have been applied to office printers, home-use printers, and the like, and have begun to be used in commercial printing in recent years. In commercial printing, requested print texture is a texture like that of common printing paper, rather than a photo-like surface which completely blocks penetration of ink solvent into base paper. An increase of the thickness of the solvent absorption layer of a recording medium to from 20 μm to 30 μm limits the range of surface gloss, texture, stiffness, and the like that the recording medium can possess. Therefore, application of inkjet techniques in commercial printing is limited to printing of posters, vouchers, and the like in which the limitation on the range of surface gloss, texture, stiffness, and the like of the recording medium is acceptable.

The presence of a solvent absorption layer and a waterproof layer in recording media exclusively for inkjet recording increases the costs, which is another factor that limits the application of inkjet techniques to commercial printing.

In connection to the above, an image recording method whereby inkjet recording is speeded is known. In this method, an ink and a treatment liquid capable of forming an aggregate upon contact with the ink are used (see Japanese Patent Application Laid-Open (JP-A) No. 2004-10633). An inkjet recording ink is disclosed which includes a pigment dispersed using a polymeric dispersant having an acid value of from 50 mgKOH/g to 120 mgKOH/g and resin particles having an acid value of from 50 mgKOH/g to 120 mgKOH/g (see JP-A No. 2007-99913). This inkjet recording ink is described to have superior storage stability and ejection stability.

SUMMARY OF THE INVENTION

When the treatment liquid is applied by coating in the inkjet recording method described in JP-A No. 2004-10633, there are cases in which an increase in the recording speed results in generation of unevenness of the coating of the treatment liquid and, resultantly, unevenness in image density. The present invention addresses provision of an inkjet recording method whereby generation of unevenness of image density is suppressed, and an inkjet print obtained by recording according to the inkjet recording method.

<1> An inkjet recording method including: coating a treatment liquid containing an acidic compound on a recording medium by roller coating at a coating speed of 300 mm/sec or higher; and ejecting an ink composition containing self-dispersing polymer particles having an acid value of from 30 mgKOH/g to 80 mgKOH/g, a pigment, and an aqueous medium, by an inkjet process, onto the recording medium coated with the treatment liquid, thereby recording an image.

<2> The inkjet recording method according to <1>, wherein the self-dispersing polymer particles include a polymer having a carboxyl group.

<3> The inkjet recording method according to <1>, wherein the self-dispersing polymer particles include an acrylic resin that contains a structural unit derived from an acrylate monomer or a methacrylate monomer.

<4> The inkjet recording method according to <1>, wherein the acidic compound is a divalent carboxylic acid.

<5> The inkjet recording method according to <1>, wherein coating the treatment liquid applies the acidic compound in an amount of from 0.25 to 0.55 $g/m^2$ onto the recording medium.

<6> The inkjet recording method according to <1>, wherein the treatment liquid has a viscosity of from 1 to 30 mPa·s at 20° C.

<7> The inkjet recording method according to <1>, further including, between the coating the treatment liquid and the ejecting the ink composition, removing at least a part of a solvent contained in the treatment liquid by drying.

<8> The inkjet recording method according to <1>, further including fixing the image by applying heat and pressure to the recording medium on which the ink composition has been applied.

<9> The inkjet recording method according to <1>, wherein the pigment is a water-dispersible pigment, and at least a part of a surface of the water-dispersible pigment is coated with a polymeric dispersant.

<10> The inkjet recording method according to <9>, wherein the polymeric dispersant includes a polymer having a carboxyl group.

<11> The inkjet recording method according to <9>, wherein an acid value of the polymeric dispersant is higher than that of the self-dispersing polymer particles.

<12> An inkjet print obtained by recording according to the inkjet recording method of <1>.

The invention provides an inkjet recording method whereby generation of unevenness of image density is suppressed, and an inkjet print obtained by recording according to the inkjet recording method.

Inkjet Recording Method

The inkjet recording method of the present invention includes at least:

a treatment liquid application process in which a treatment liquid containing an acidic compound is coated on a recording medium by roller coating at a coating speed of 300 mm/sec or higher; and an ink application process in which an ink composition (hereinafter sometimes simply referred to as "ink") containing self-dispersing polymer particles having an acid value of from 30 mgKOH/g to 80 mgKOH/g, a pigment, and an aqueous medium is ejected, by an inkjet process, onto the recording medium coated with the treatment liquid so as to record an image.

The inkjet recording method of the invention may include one or more optional processes, as necessary.

Since an image is recorded using an ink composition containing a self-dispersing polymer having a specific acid value, generation of an image density unevenness caused by unevenness in the coating of the treatment liquid is suppressed.

Treatment Liquid Application Process

In the inkjet recording method of the invention, for improving recording of an image by applying an ink composition, a treatment liquid containing an acidic compound, which is capable of aggregating components of the ink composition, is applied onto the recording medium by roller coating at a coating speed of 300 mm/sec or higher. The use of roller coating for the application of the treatment liquid facilitates control of the application amount of the treatment liquid. A treatment liquid coating speed of less than 300 mm/sec does not achieve a sufficient printing speed.

In general, when applying a treatment liquid by roller coating, it is preferable that a coating bead formed from the treatment liquid is formed uniformly at around a point of contact between the roller and the recording medium. However, an increased coating speed may destabilize the state of the formed bead. The instability of the bead may lead to generation of a crepey fine unevenness of the coating amount of the treatment liquid on the recording medium. When an ink composition is applied onto the recording medium having the unevenness of the coating of the treatment liquid, the diameters of the dots formed by the ink composition vary due to the unevenness of the coating of the treatment liquid, and, in some cases, the variation of dot diameter is visually observed as fine unevenness of image density (hereinafter sometimes referred to as "crepey unevenness").

The unevenness of the coating of the treatment liquid hardly occurs at a coating speed of the treatment liquid of less than 300 mm/sec. However, the unevenness of the coating of the treatment liquid is a significant problem in commercial printing in which a higher speed printing than the above coating speed is requested.

In the invention, the use of the ink composition containing self-dispersing polymer particles having an acid value within a specific range in recording of an image efficiently suppresses unevenness of the image density (crepey unevenness) caused by unevenness of the coating of the treatment liquid.

The roller coating in the invention may be performed according to a commonly-used roller coating method without particular restriction. Examples of roller coating methods include a method of supplying the treatment liquid onto a coating roller and coating the treatment liquid on a recording medium via the coating roller and a method of applying the treatment liquid onto a recording medium and uniformizing the coating by using a coating roller. In the invention, the roller coating is performed preferably by a method of supplying the treatment liquid onto a coating roller and coating the treatment liquid on a recording medium via the coating roller. More specifically, the coating roller methods described in *Coating* (edited by "Coating" Editorial Committee of Converting Technical Institute), chapter V, pp. 232 to 236, which is incorporated herein by reference, are preferable, and an offset gravure coater method and a direct roll coater method are more preferable.

The speed of coating the treatment liquid in the invention is 300 mm/sec or higher. The speed of coating the treatment liquid is preferably 350 mm/sec or higher, and more preferably 400 mm/sec or higher, from the viewpoint of high-speed printing.

Treatment Liquid

The treatment liquid in the invention may include at least one acidic compound and an aqueous medium, and, optionally, one or more other components. Components of the ink composition are aggregated by contact between the acidic compound and the ink composition, whereby a high-speed image recording is enabled.

The acidic compound in the invention is not particularly limited as long as the acidic compound is capable of aggregating components of the ink composition. The acidic compound may be an inorganic acid or an organic acid. Examples of the acidic compound include: sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumalic acid, thiophenecarboxylic acid, and nicotinic acid; derivatives of these compounds; and salts thereof.

The acidic compound may be used singly, or in a combination of two or more thereof.

The acidic compound in the invention is preferably an acidic compound having a high water-solubility. From the viewpoints of enhancing ability to coagulate the ink composition and fixing the entire ink, an organic acid is preferable, a di- or higher-valent organic acid is more preferable, and a divalent carboxylic acid is particularly preferable. The di- or higher-valent organic acid is preferably an organic acid of which first pKa is 3.5 or lower, and is more preferably an organic acid of which first pKa is 3.0 or lower. Specific examples thereof include oxalic acid, malonic acid, and citric acid.

In the treatment liquid, the content of the acidic compound capable of aggregating the ink composition is preferably from 1 to 50% by mass, more preferably from 3 to 45% by mass, and still more preferably from 5 to 40% by mass, with respect to the total amount of the treatment liquid, from the viewpoint of the capability of coagulating the ink composition.

In accordance with the necessity, the treatment liquid in the invention may further include an aggregation component, other than the acidic compound, that is capable of aggregating components in the ink composition. Examples of aggregation components other than the acidic compound include a polyvalent metal salt and a polyallylamine.

Examples of the polyvalent metal salt include: a salt of an alkaline earth metal, which belongs to Group 2 of the Periodic Table, such as magnesium or calcium; a salt of a transition metal belonging to Group 3 of the Periodic Table, such as lanthanum; a salt of a metal belonging to Group 13 of the Periodic Table, such as aluminum; and a salt of a lanthanide, such as neodymium. The salt of such a metal is preferably a carboxylic acid salt (such as a formate, acetate, or benzoate), a nitrate, a chloride, or a thiocyanate. In particular, the following salts are preferable: a calcium or magnesium salt of a carboxylic acid (such as formic acid, acetic acid, or benzoic acid); a calcium or magnesium salt of nitric acid; calcium chloride; magnesium chloride; and a calcium or magnesium salt of thiocyanic acid.

In the treatment liquid, the content of aggregation components other than the acidic compound is not particularly limited, and may be within the above-described range of the content of the acidic compound in the treatment liquid.

The treatment liquid may include one or more other additives as optional components, as long as effects of the invention are not impaired. Examples of other additives include known additives such as an anti-drying agent (humectant), an anti-fading agent, an emulsion stabilizer, a penetration enhancing agent, a UV absorber, an antiseptic agent, an anti-mildew agent, a pH adjuster, a surface tension controller, an anti-foam agent, a viscosity adjuster, a dispersant, a dispersion stabilizer, an antirust agent, and a chelating agent.

The treatment liquid in the invention, including an acidic compound, preferably has a pH at 25° C. of 6 or lower, more preferably 4 or lower. In particular, the pH of the treatment liquid at 25° C. is preferably in a range of from 0.5 to 4, more preferably in a range of from 1 to 4, and particularly preferably in a range of from 1 to 3. The pH of the ink composition at 25° C. is preferably 7.5 or higher, and more preferably 8.0 or higher.

From the viewpoints of image density, resolution, and speeding of inkjet recording, it is preferable that the pH of the ink composition at 25° C. is 8.0 or higher and the pH of the treatment liquid at 25° C. is from 0.5 to 4.

The viscosity of the treatment liquid is preferably in a range of from 1 mPa·s to 30 mPa·s, more preferably from 1 mPa·s to 20 mPa·s, and still more preferably from 2 mPa·s to 15 mPa·s, and particularly preferably from 2 mPa·s to 10 mPa·s, from the viewpoints of aggregation speed of the ink composition and suitability for roller coating. Here, the viscosity is measured at 20° C. using a VISCOMETER TV-22 manufactured by TOKI SANGYO CO. LTD.

The surface tension of the treatment liquid is preferably from 20 mN/m to 60 mN/m, more preferably from 20 mN/m to 50 mN/m, and still more preferably from 25 mN/m to 45 mN/m, from the viewpoints of aggregation speed of the ink composition and suitability for roller coating. Here, the surface tension is measured at 25° C. using an automatic surface tensiometer CBVP-Z manufactured by Kyowa Interface Science Co., Ltd.

The application amount of the treatment liquid in the treatment liquid application process may be suitably selected in accordance with the total application amount of the ink composition described below. Alternatively, the total application amount of the ink composition may be selected in accordance with the coating amount of the treatment liquid. In the invention, the average application amount of the acidic compound in a region on the recording medium that is applied with the treatment liquid is preferably from 0.1 to 1.0 g/m$^2$, more preferably from 0.15 to 0.70 g/m$^2$, and still more preferably from 0.25 to 0.55 g/m$^2$, from the viewpoint of capability of coagulating the ink composition.

When the application amount of the treatment liquid is 0.1 g/m$^2$ or more, the applied ink composition is effectively coagulated and fixed, whereby an image having a high resolution can be recorded. When the application amount of the treatment liquid is 1.0 g/m$^2$ or less, damage to the recording medium is reduced, and a decrease in abrasion resistance is suppressed. An application amount of the treatment liquid of 1.0 g/m$^2$ or less is particularly preferable when the recording medium has a coat layer, with a view to suppressing damage to the coat layer.

In the treatment liquid application process in the invention, it is preferable that a divalent carboxylic acid is applied at an average application amount of from 0.1 to 1.0 g/m$^2$, it is more preferable that a divalent carboxylic acid having a first pKa of 3.5 or lower is applied at an average application amount of from 0.15 to 0.70 g/m$^2$, and it is still more preferable that a divalent carboxylic acid having a first pKa of 3.0 or lower is applied at an application amount of from 0.25 to 0.55 g/m$^2$.

In the invention, an ink application process is conducted after the treatment liquid application process. It is preferable to further conduct a drying process of removing at least a part of the solvent contained in the treatment liquid during a period after the roller coating of the treatment liquid on the recording medium but before the application of the ink composition. As a result of the drying process, improvement in ink coloring properties, such as suppression of bleed, are achieved, and an image having improved color density and hue can be recorded.

The drying process is not particularly limited as long as at least a part of the solvent in the treatment liquid is removed thereby, and is preferably a process of removing solvent by drying by heating. The drying by heating may be conducted by using a known heating device such as a heater, a blowing device, which utilizes blowing, such as a dryer, or a combination thereof. The heating may be performed according to, for example, a method of applying heat, by using a heater or the like, from a side of the recording medium opposite to the surface applied with the treatment liquid, a method of blowing warm or hot air to the surface of the recording medium applied with the treatment liquid, or a method of heating by using an infrared heater. Alternatively, two or more of these methods may be combined and used for the heating.

Ink Application Process

In the ink application process, an ink composition including at least one kind of self-dispersing polymer particles, at least one pigment, and an aqueous solvent is ejected, according to an inkjet method, onto the recording medium coated with the treatment liquid, thereby recording an image.

Since the acid value of the self-dispersing polymer particles contained in the ink composition is from 30 mgKOH/g to 80 mgKOH/g, occurrence of image density unevenness (crepey unevenness) caused by unevenness of the coating of the treatment liquid is effectively suppressed.

(Ink Composition)

Self-Dispersing Polymer Particles

The ink composition in the invention includes at least one kind of self-dispersing polymer particles. The self-dispersing polymer particles have a function of fixing the ink composition by increasing the viscosity of the ink. More specifically, when the self-dispersing polymer particles contact with the treatment liquid or with a region on which the treatment liquid is applied and dried, the dispersion state of the self-dispersing polymer particles is destabilized, and thus the self-dispersing polymer particles aggregate, thereby increasing the viscosity of the ink. Due to the function of the self-dispersing polymer particles, the fixability of the ink composition to the recording medium and the abrasion resistance of the image are further improved. The self-dispersing properties of the self-dispersing polymer particles improve ejection stability, and the liquid stability (particularly, dispersion stability) of the system containing the below-described pigment.

The term "self-dispersing polymer particles" used herein refers to particles of a water-insoluble polymer that can get into a dispersed state in an aqueous medium due to functional groups (particularly, acid groups or a salt thereof) of the polymer itself even in the absence of a surfactant, and that does not include a free emulsifying agent.

The scope of the term "dispersed state" used herein includes both an emulsified state (emulsion) in which a water-insoluble polymer in the liquid state is dispersed in an aqueous medium and a dispersed state (suspension) in which a water-insoluble polymer in the solid state is dispersed in an aqueous medium.

The water-insoluble polymer used in the invention is preferably a water-insoluble polymer that can get into a dispersed state in which the water-insoluble polymer is dispersed in the solid state, in consideration of the coagulation speed and the fixability when the water-insoluble polymer is contained in a liquid composition.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, the solution is mixed with 200 g of water and a neutralizing agent (sodium hydroxide) that can neutralize the salt-forming groups of the water-insoluble polymer to a degree of 100%, the mixture is stirred with a stirrer having a stirring blade at a rotation rate of 200 rpm at 25° C. for 30 minutes, and the organic solvent is removed from the mixture liquid. If a stable dispersion state of the water-insoluble polymer in the mixture liquid is confirmed by visual observation for at least one week at 25° C. after the removal of the organic solvent, the water-insoluble polymer is considered to be a self-dispersing polymer.

The term "water-insoluble polymer" used herein refers to a polymer that shows a solubility of 10 g or less when the polymer is dried at 105° C. for 2 hours and then dissolved in 100 g of water at 25° C. The solubility is preferably 5 g or less, and more preferably 1 g or less. The solubility mentioned above is a value measured after the polymer is 100% neutralized with sodium hydroxide.

The aqueous medium to be used with the self-dispersing polymer particles includes water and, optionally, a hydrophilic organic solvent. In the invention, the aqueous medium is preferably formed by water and a hydrophilic organic solvent whose amount is 0.2% by mass or less with respect to the amount of the water, and is more preferably formed by water only.

The main chain skeleton of the water-insoluble polymer is not particularly limited, and may be a vinyl polymer or a condensed polymer (such as an epoxy resin, a polyester, a polyurethane, a polyamide, cellulose, a polyether, a polyurea, a polyimide, or a polycarbonate). Among them, a vinyl polymer is preferable.

Preferable examples of vinyl polymers and monomers for forming vinyl polymers include those described in JP-A Nos. 2001-181549 and 2002-88294. A vinyl polymer may be used which has a dissociative group introduced to a terminal of the polymer chain; the dissociative group may be introduced by radical polymerization of a vinyl monomer using a chain transfer agent, polymerization initiator, or iniferter that has the dissociative group (or a substituent that can be converted to the dissociative group), or by ion polymerization using a compound having the dissociative group (or a substituent that can be converted to the dissociative group) as either of an initiator or a terminator.

Preferable examples of condensed polymers and monomers for forming condensed polymers include those described in JP-A No. 2001-247787.

The self-dispersing polymer particles preferably include a water-insoluble polymer containing at least one hydrophilic structural unit and a structural unit derived from a aromatic-group-containing monomer, from the viewpoint of self-dispersibility.

The at least one hydrophilic structural unit is not particularly limited as long as the at least one hydrophilic structural unit includes one or more hydrophilic structural units having at least one type of anionic dissociative group. The at least one hydrophilic structural unit may derive from only one type of hydrophilic-group-containing monomer or from two or more types of hydrophilic-group-containing monomer. The expression "... structural unit ... derived from ... (A)" used herein means a component in a polymer which component is formed by the binding of (A) to an adjacent structural unit or units. The hydrophilic groups contained in the at least one hydrophilic structural unit may include, in addition to the anionic dissociative group(s), at least one of a cationic dissociative group or a nonionic hydrophilic group.

In the invention, the at least one type of anionic dissociative group preferably includes at least one selected from a carboxyl group, a phosphoric acid group, or a sulfonic acid group, from the viewpoints of enhancing self-dispersibility and providing stability of the formed emulsion or dispersion state. In particular, a carboxyl group is preferable as the anionic dissociative group, in consideration of the fixability of an ink composition containing the self-dispersing polymer particles.

The at least one hydrophilic structural unit in the invention preferably includes a hydrophilic structural unit derived from a monomer containing an anionic dissociative group, and more preferably includes a hydrophilic structural unit derived from a monomer containing an anionic dissociative group and an ethylenic unsaturated bond, in consideration of self-dispersibility and aggregation properties.

The monomer containing an anionic dissociative group may be, for example, an unsaturated carboxylic acid monomer, an unsaturated sulfonic acid monomer, or an unsaturated phosphoric acid monomer.

Examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid.

Examples of the unsaturated sulfonic acid monomer include styrenesulfonic acid, 2-acrylamide-2-methylpropane sulfonic acid, 3-sulfopropyl (meth)acrylate, and bis-(3-sulfopropyl) itaconate.

Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, (meth)acrylic monomers are more preferable, and acrylic acid and methacrylic acid are still more preferable, in consideration of dispersion stability and ejection stability.

The acid value of the self-dispersing polymer in the invention is from 30 mgKOH/g to 80 mgKOH/g. The acid value of the self-dispersing polymer is preferably from 30 mgKOH/g to 70 mgKOH/g, and more preferably from 35 mgKOH/g to 65 mgKOH/g, from the viewpoints of aggregation properties when contacting with the treatment liquid, suppression of crepey unevenness, and self-dispersibility. When the acid value of the self-dispersing polymer is lower than 30 mgKOH/g, the self-dispersibility may decrease, and the ejection properties of the ink composition are deteriorated in some cases. When the acid value of the self-dispersing polymer is higher than 70 mgKOH/g, crepey unevenness is not efficiently suppressed in some cases.

The acid value of the self-dispersing polymer is determined according to the method described in JIS K0070:1992, which is incorporated herein by reference.

The self-dispersing polymer in the invention preferably includes one or more structural units having an anionic dissociative group such that the acid value of the self-dispersing polymer is within the above range.

The aromatic-group-containing monomer is not particularly limited as long as the monomer is a compound containing an aromatic group and a polymerizable group. The aromatic group may be a group derived from an aromatic hydrocarbon or from an aromatic heterocycle. In the invention, the aromatic group is preferably an aromatic group derived from an aromatic hydrocarbon, from the viewpoint of improving the stability of the particle shape in an aqueous medium. The expression "group derived from an aromatic hydrocarbon or from an aromatic heterocycle" used herein means a group formed by removing at least one hydrogen atom from an aromatic hydrocarbon or from an aromatic heterocycle.

The polymerizable group may be a condensation-polymerizable group or an addition-polymerizable group. In the invention, the polymerizable group is preferably an addition-polymerizable group, and more preferably a polymerizable group containing an ethylenic unsaturated bond, from the viewpoint of improving the stability of the particle shape in an aqueous medium.

The aromatic-group-containing monomer in the invention is preferably a monomer having an aromatic group derived from an aromatic hydrocarbon and an ethylenic unsaturated bond. The aromatic-group-containing monomer may be used singly or in combination of two or more thereof.

Examples of the aromatic-group-containing monomer include phenoxyethyl (meth)acrylate, benzyl (meth)acrylate, phenyl (meth)acrylate, and a styrene-based monomer. In particular, from the viewpoint of improving the balance between the hydrophilicity and hydrophobicity of the polymer chain and ink fixability, an aromatic-group-containing (meth)acrylate monomer is preferable, and at least one selected from phenoxyethyl (meth)acrylate, benzyl (meth)acrylate, or phenyl (meth)acrylate is more preferable, and at least one selected from phenoxyethyl (meth)acrylate or benzyl (meth) acrylate is still more preferable.

The term "(meth)acrylate" used herein refers to acrylate or methacrylate.

In the invention, the self-dispersing polymer is preferably a (meth)acrylic resin containing a structural unit derived from a (meth)acrylate monomer, more preferably a (meth)acrylic resin containing a structural unit derived from an aromatic-group-containing (meth)acrylate monomer, and still more preferably a (meth)acrylic resin containing a structural unit derived from an aromatic-group-containing (meth)acrylate monomer at a content of from 10 to 95% by mass. When the content of the structural unit derived from an aromatic-group-containing (meth)acrylate monomer is from 10 to 95% by mass, stability of self-emulsification or self-dispersion state improves, and, further, an increase in the ink viscosity can be suppressed.

The content of the structural unit derived from the aromatic-group-containing monomer in the self-dispersing polymer particles is more preferably from 15 to 90% by mass, still more preferably from 15 to 80% by mass, and particularly preferably from 25 to 70% by mass, from the viewpoints of improving stability of the self-dispersing state, stabilizing the particle shape in an aqueous medium through hydrophobic interaction between aromatic rings, and reducing the amount of water-soluble components by imparting appropriate hydrophobicity to the particles.

In the invention, the self-dispersing polymer may include, for example, a structural unit derived from an aromatic-group-containing monomer and a structural unit derived from a monomer containing an anionic dissociative group. The self-dispersing polymer may further include another structural unit, as necessary.

The monomer for forming another structural unit is not particularly limited as long as the monomer is copolymerizable with the aromatic-group-containing monomer and the dissociative-group-containing monomer. In particular, an alkyl-group-containing monomer is preferable from the viewpoint of flexibility of the polymer skeleton and ease in regulating the glass transition temperature (Tg).

Examples of the alkyl-group-containing monomer include (meth)acrylic ester monomers containing an alkyl group and (meth)acrylamide monomers containing an alkyl group. Examples of (meth)acrylic ester monomers containing an alkyl group include alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; ethylenic unsaturated monomers each having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth) acrylate; and dialkylaminoalkyl (meth)acrylates such as dimethylaminoethyl (meth)acrylate. Examples of (meth)acrylamide monomers containing an alkyl group include N-hydroxyalkyl (meth)acrylamides (such as N-hydroxymethyl (meth)acrylamide, N-hydroxyethyl (meth)acrylamide, and N-hydroxybutyl (meth)acrylamide) and N-alkoxyalkyl (meth)acrylamides (such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, and N-(n-, iso) butoxyethyl (meth)acrylamide).

The molecular weight of the water-insoluble polymer forming the self-dispersing polymer particles is preferably from 3,000 to 200,000, more preferably from 5,000 to 150,000, and still more preferably from 10,000 to 100,000, in terms of weight average molecular weight. When the weight average molecular weight is 3,000 or more, the amount of water-soluble component is effectively set to a small amount. When the weight average molecular weight is 200,000 or less, the self-dispersing stability is improved.

The weight average molecular weight is measured with a gel permeation chromatography (GPC). A GPC instrument, HLC-8220GPC manufactured by Tosoh Corporation, is used; the columns (three in number) to be used are TSKGEL SUPER HZM-H, TSKGEL SUPER HZ4000, and TSKGEL SUPER HZ2000 (all manufactured by Tosoh Corporation, 4.6 mmID×15 cm); and THF (tetrahydrofuran) is used as an eluent. Regarding the GPC conditions, the sample concentration is 0.35% by mass, the flow rate is 0.35 ml/min, the sample injection amount is 10 μl, and the measurement temperature is 40° C. The detection is performed by using a refractive index detector. The calibration curve is determined from the following eight samples: standard samples TSK STANDARD POLYSTYRENE of F-40, F-20, F-4, F-1, A-5000, A-2500, A-1000, and n-propylbenzene, all manufactured by Tosoh Corporation.

When the water-insoluble polymer forming the self-dispersing polymer particles contains a structural unit derived from an aromatic-group-containing (meth)acrylate monomer (preferably a structural unit derived from phenoxyethyl (meth)acrylate and/or a structural unit derived from benzyl (meth)acrylate), the copolymerization ratio of the structural unit derived from an aromatic-group-containing (meth)acrylate monomer is preferably from 15 to 80% by mass with respect to the total mass of the self-dispersing polymer particles, from the viewpoint of regulating the hydrophilicity/hydrophobicity of the polymer.

From the viewpoint of regulating the hydrophilicity/hydrophobicity of the polymer, the water-insoluble polymer preferably includes a structural unit derived from an aromatic-group-containing (meth)acrylate monomer at a copolymerization ratio of from 15 to 80% by mass, a structural unit derived from a carboxyl-group-containing monomer, and a structural unit derived from an alkyl-group-containing monomer (preferably a structural unit derived from an alkyl (meth)acrylate), and more preferably includes a structural unit derived from phenoxyethyl (meth)acrylate and/or a structural unit derived from benzyl (meth)acrylate at a total copolymerization ratio of from 15 to 80% by mass, a structural unit derived from a carboxyl-group-containing monomer, and a structural unit derived from an alkyl-group-containing monomer (preferably a structural unit derived from (meth)acrylic ester of an alkyl having 1 to 4 carbon atoms); further it is preferable that the acid value of the water-insoluble polymer is from 30 to 80 (mg KOH/g) and the weight average molecular weight of the water-insoluble polymer is from 3,000 to 200,000, and it is more preferable that the acid value is from 30 to 70 (mg KOH/g) and the weight average molecular weight is from 5,000 to 150,000.

Exemplary compounds B-01 to B-19 are shown below, which are examples of the water-insoluble polymer forming self-dispersing polymer particles. However, the invention is not limited thereto. The numbers in the parentheses indicate mass ratios of copolymerization components.

B-01: phenoxyethyl acrylate/methyl methacrylate/acrylic acid copolymer (50/45/5)
B-02: phenoxyethyl acrylate/benzyl methacrylate/isobutyl methacrylate/methacrylic acid copolymer (30/35/29/6)
B-03: phenoxyethyl methacrylate/isobutyl methacrylate/methacrylic acid copolymer (50/44/6)
B-04: phenoxyethyl acrylate/methyl methacrylate/ethyl acrylate/acrylic acid copolymer (30/55/10/5)
B-05: benzyl methacrylate/isobutyl methacrylate/methacrylic acid copolymer (35/59/6)
B-06: styrene/phenoxyethyl acrylate/methyl methacrylate/acrylic acid copolymer (10/50/35/5)
B-07: benzyl acrylate/methyl methacrylate/acrylic acid copolymer (55/40/5)
B-08: phenoxyethyl methacrylate/benzyl acrylate/methacrylic acid copolymer (45/47/8)
B-09: styrene/phenoxyethyl acrylate/butyl methacrylate/acrylic acid copolymer (May 48, 1940/7)
B-10: benzyl methacrylate/isobutyl methacrylate/cyclohexyl methacrylate/methacrylic acid copolymer (35/30/30/5)
B-11: phenoxyethyl acrylate/methyl methacrylate/butyl acrylate/methacrylic acid copolymer (12/50/30/8)
B-12: benzyl acrylate/isobutyl methacrylate/acrylic acid copolymer (93/2/5)
B-13: styrene/phenoxyethyl methacrylate/butyl acrylate/acrylic acid copolymer (50/5/20/25)
B-14: styrene/butyl acrylate/acrylic acid copolymer (62/35/3)
B-15: methyl methacrylate/phenoxyethyl acrylate/acrylic acid copolymer (45/51/4)
B-16: methyl methacrylate/phenoxyethyl acrylate/acrylic acid copolymer (45/49/6)
B-17: methyl methacrylate/phenoxyethyl acrylate/acrylic acid copolymer (45/48/7)
B-18: methyl methacrylate/phenoxyethyl acrylate/acrylic acid copolymer (45/47/8)
B-19: methyl methacrylate/phenoxyethyl acrylate/acrylic acid copolymer (45/45/10)

The method of producing the water-insoluble polymer forming the self-dispersing polymer particles in the invention is not particularly limited, and may be a method including performing emulsion polymerization in the presence of a polymerizable surfactant so as to covalently bond the surfactant to the water-insoluble polymer or a method including copolymerizing a monomer mixture containing the hydrophilic-group-containing monomer and the aromatic-group-containing monomer by a known polymerization process such as a solution polymerization method or a bulk polymerization method. Among the above polymerization methods, a solution polymerization is preferable, and a solution polymerization method using an organic solvent is more preferable, in consideration of aggregation speed and ejection stability of an ink composition containing the self-dispersing polymer particles.

From the viewpoint of aggregation speed, the self-dispersing polymer particles in the invention preferably includes a polymer synthesized in an organic solvent, wherein the polymer has carboxyl groups and has an acid value of from 30 mgKOH/g to 80 mgKOH/g, all or some of the carboxyl groups of the polymer are neutralized, and the polymer is prepared in the form of a polymer dispersion in which water constitutes the continuous phase. In other words, the production of the self-dispersing polymer particles in the invention preferably includes a step of synthesizing a polymer in an organic solvent and a dispersing step of forming an aqueous dispersion in which at least some of the carboxyl groups of the polymer are neutralized.

The dispersion step preferably includes the following substeps (1) and (2):

Substep (1): a step of stirring a mixture containing a polymer (water-insoluble polymer), an organic solvent, a neutralizing agent, and an aqueous medium Substep (2): a step of removing the organic solvent from the mixture The substep (1) is preferably a process in which the polymer (water-insoluble polymer) is dissolved or dispersed in the organic solvent, and then the neutralizing agent and the aqueous medium are gradually added to the polymer solution and mixed, by stirring, with the polymer solution to form a dispersion. When the neutralizing agent and the aqueous medium are added to the water-insoluble polymer solution in which the water-insoluble polymer is dissolved in the organic solvent as in the above process, self-dispersing polymer particles whose diameter is highly stable during storage can be obtained without requiring a strong shearing force.

The method of stirring the mixture is not particularly limited, and may be a method using a generally-used mixing and stirring apparatus and/or, if necessary, a disperser such as an ultrasonic disperser or a high-pressure homogenizer.

Preferable examples of the organic solvent described above include an alcohol solvent, a ketone solvent, and an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, ketone solvents such as methyl ethyl ketone and alcohol solvents such as isopropyl alcohol are preferable. It is also preferable to use isopropyl alcohol and methyl ethyl ketone together for the purpose of making milder the polarity change at the time of phase inversion from an oil phase to an aqueous phase; using the solvents together makes it possible to obtain self-dispersing polymer particles having a very small particle diameter that are free from aggregation precipitation or adhesion between the particles and that have high dispersion stability.

The neutralizing agent is used to neutralize all or some of the dissociative groups of the self-dispersing polymer so as to allow the self-dispersing polymer particles to get into a stable emulsion or dispersion state in water. Since the self-dispersing polymer in the invention has an anionic dissociative group (e.g., a carboxyl group) as a dissociative group, the neutralizing agent to be used may be a basic compound such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, monoisopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of dispersion stability of the self-dispersing polymer particles of the invention in water.

The amount of the basic compound to be used is preferably from 5 to 120 mol %, more preferably from 10 to 110 mol %, and still more preferably from 15 to 100 mol %, with respect to 100 mol % of the dissociative group. When the amount of the basic compound is 5 mol % or more, an effect of stabilizing the dispersion of the particles in water can be obtained. When the amount of the basic compound is 120 mol % or less, an effect of decreasing the amount of the water-soluble component can be obtained.

In the substep (2), the organic solvent is removed from the dispersion obtained by the substep (1) using a common method such as distillation under reduced pressure, whereby phase inversion into an aqueous system occurs and an aqueous dispersion of the self-dispersing polymer particles is obtained. The organic solvent has substantially been removed from the obtained aqueous dispersion, and the amount of the remaining organic solvent is preferably 0.2% by mass or less, and more preferably 0.1% by mass or less.

The average particle diameter of the self-dispersing polymer particles is preferably in the range of from 10 nm to 400 nm, more preferably in the range of from 10 nm to 200 nm, still more preferably from 10 nm to 100 nm, particularly preferably from 10 nm to 50 nm, in terms of volume average particle diameter. When the volume average particle diameter is 10 nm or more, the suitability for production is improved. When the volume average particle diameter is 400 nm or less, storage stability is improved.

The particle size distribution of the self-dispersing polymer particles is not particularly limited, and may be a broad particle size distribution or a mono-dispersed particle size distribution. It is possible to use a mixture of two or more types of water-insoluble particles.

The volume average particle diameter and particle size distribution of the self-dispersing polymer particles is obtained by measuring the diameters of the particles by a dynamic light scattering method using Nanotrac particle size distribution measuring instrument UPA-EX150 manufactured by Nikkiso Co., Ltd.

The glass transition temperature (Tg) of the self-dispersing polymer is preferably 30° C. or higher, more preferably 40° C. or higher, and still more preferably 50° C. or higher, from the viewpoint of storage stability of the ink composition.

It is possible to use one type of self-dispersing polymer particles or a mixture of two or more types of self-dispersing polymer particles. The content of the self-dispersing polymer particles in the ink composition is preferably from 1 to 30% by mass, and more preferably from 5 to 15% by mass, with respect to the mass of the ink composition, from the viewpoints of aggregation speed, image gloss and the like.

In the ink composition, the content ratio of pigment to self-dispersing polymer particles (for example, water-insoluble pigment particles/self-dispersing polymer particles) is preferably in the range of from 1/0.5 to 1/10, and more preferably in the range of from 1/1 to 1/4, from the viewpoint of, for example, abrasion resistance of an image.

Pigment

The ink composition in the invention includes at least one pigment as a colorant component. The pigment is not particularly limited, and may be selected appropriately according to the purpose. For example, the pigment may be an organic pigment or an inorganic pigment. The pigment is preferably almost completely insoluble in water or hardly-soluble in water, in consideration of ink coloring properties.

Examples of the organic pigment include azo pigments, polycyclic pigments, dye chelates, nitro pigments, nitroso pigments, and aniline black. Among these, azo pigments and polycyclic pigments are preferable. Examples of organic pigments that can be suitably used in the invention include the pigments described in paragraphs [0142] to [0145] of JP-A No. 2007-100071.

Examples of the inorganic pigment include titanium oxide, iron oxide, calcium carbonate, barium sulfate, aluminum hydroxide, barium yellow, cadmium red, chromium yellow, and carbon black. Among these, carbon black is preferable.

Dispersant

The ink composition of the invention may contain at least one dispersant. The dispersant for dispersing a pigment may be either a polymeric dispersant or a low-molecular surfactant-type dispersant. The polymeric dispersant may be either water-soluble or water-insoluble.

With the low-molecular surfactant-type dispersant, a pigment can be dispersed in an aqueous medium in a stable manner, while maintaining the viscosity of the ink at a low level. The low-molecular surfactant-type dispersant is a low-molecular dispersant having a molecular weight of 2,000 or less, preferably from 100 to 2,000, and more preferably from 200 to 2,000.

The low-molecular surfactant-type dispersant mentioned above has a structure containing a hydrophilic group and a hydrophobic group. The number of hydrophilic groups and the number of hydrophobic groups per one molecule are each independently one or more. The low-molecular surfactant-type dispersant may include plural kinds of hydrophilic group and/or plural kinds of hydrophobic group. The low-molecular surfactant-type dispersant may include a linking group that links a hydrophilic group and a hydrophobic group, as appropriate.

Examples of the hydrophilic group include an anionic group, a cationic group, and a nonionic group, and a betaine group in which two or more of the above groups are combined.

The anionic group is not particularly limited as long as the group has a negative charge. The anionic group is preferably a phosphoric acid group, a phosphonic acid group, a phosphinic acid group, a sulfuric acid group, a sulfonic acid group, a sulfinic acid group, or a carboxyl group, more preferably a phosphoric acid group or a carboxyl group, and still more preferably a carboxyl group.

The cationic group is not particularly limited as long as the group has a positive charge. The cationic group is preferably an organic cationic group, more preferably a cationic group of nitrogen or phosphorus, and further preferably a pyridinium cationic group or an ammonium cationic group.

Examples of the nonionic group include polyethylene oxide, polyglycerin, and a sugar unit of a certain kind The hydrophilic group is preferably an anionic group. The anionic group is preferably a phosphoric acid group, a phosphonic acid group, a phosphinic acid group, a sulfuric acid group, a sulfonic acid group, a sulfinic acid group, or a carboxyl group, more preferably a phosphoric acid group or a carboxyl group, and still more preferably a carboxyl group.

When the low-molecular surfactant-type dispersant has an anionic hydrophilic group, the dispersant preferably has a pKa of 3 or higher, from the viewpoint of promoting coagulation reaction upon contacting with an acidic treatment liquid. Here, the pKa of the low-molecular surfactant-type dispersant is an experimentally-obtained value based on a titration curve which is obtained by titrating a 1 mmol/L solution of a low-molecular surfactant-type dispersant in tetrahydrofuran/water at a ratio of 3:2 (THF:water, V/V), with an acid or alkali aqueous solution. When the pKa of the low-molecular surfactant-type dispersant is 3 or higher, 50% or more of the anionic groups theoretically become undissociated upon contact with a liquid having a pH of about 3. Accordingly, the water-solubility of the low-molecular surfactant-type dispersant is significantly reduced, as a result of which a coagulation reaction occurs, namely, the coagulation reactivity is improved. From this point of view, the low-molecular surfactant-type dispersant preferably has a carboxyl group as an anionic group.

The hydrophobic group has, for example, a hydrocarbon structure, a fluorocarbon structure, or a silicone structure, and the hydrocarbon structure is preferable. The hydrophobic group may have either a straight-chain structure or a branched structure. Further, the hydrophobic group may have a single-chain structure or multi-chain structure. When there are two or more chains, the chains may include two or more kinds of hydrophobic group. The hydrophobic group is preferably a hydrocarbon group having a carbon number of from 2 to 24, more preferably from 4 to 24, and yet more preferably from 6 to 20.

When the polymeric dispersant is a water-soluble dispersant, examples thereof include a hydrophilic polymer compound. Examples of naturally-occurring hydrophilic polymer compounds include plant polymers such as gum arabic, gum tragacanth, guar gum, gum karaya, locust bean gum, arabinogalactan, pectin and quince seed starch, algae polymers such as alginic acid, carrageenan and agar, animal polymers such as gelatin, casein, albumin and collagen, and microbial polymers such as xanthene gum and dextran.

The term "water-soluble dispersant" as used herein refers to a dispersant of which 5 g or more dissolve in 100 g of water at 25° C.

Examples of hydrophilic polymer compounds obtained by modifying natural raw materials include cellulose polymers such as methyl cellulose, ethyl cellulose, hydroxyethyl cellulose, hydroxypropyl cellulose and carboxymethyl cellulose, starch polymers such as sodium starch glycolate (sodium salt of starch glycolate), and sodium starch phosphate (sodium salt of starch phosphate [ester]), and algae polymers such as sodium alginate and propylene glycol alginate.

Examples of synthetic hydrophilic polymer compounds include vinyl polymers such as polyvinyl alcohol, polyvinyl pyrrolidone and polyvinyl methyl ether; acrylic resins such as non-crosslinked polyacrylamide, polyacrylic acid or an alkali metal salt thereof, and water-soluble styrene acrylic resins; water-soluble styrene maleic acid resins; water-soluble vinylnaphthalene acrylic resins; water-soluble vinylnaphthalene maleic acid resins; polyvinyl pyrrolidone; polyvinyl alcohol; alkali metal salts of formalin condensates of β-naphthalene sulfonic acid; polymer compounds having, at a side chain, a salt of a cationic functional group such as a quaternary ammonium group or an amino group; and natural polymer compounds such as shellac.

Among these, water-soluble dispersants to which a carboxyl group is introduced are preferable as hydrophilic polymer compounds, and examples thereof include homopolymers of acrylic acid, methacrylic acid or styrene acrylic acid, and copolymers thereof with another monomer having a hydrophilic group.

Among polymeric dispersants, examples of water-insoluble dispersants include a polymer having both of a hydrophilic moiety and a hydrophobic moiety, such as a styrene-(meth)acrylic acid copolymer, a styrene-(meth)acrylic acid-(meth)acrylic ester copolymer, a (meth)acrylic ester-(meth)acrylic acid copolymer, a polyethyleneglycol (meth)acrylate-(meth)acrylic acid copolymer, a vinyl acetate-maleic acid copolymer, and a styrene-maleic acid copolymer.

The weight average molecular weight of the polymeric dispersant is preferably from 3,000 to 100,000, more preferably from 5,000 to 50,000, further preferably from 5,000 to 40,000, and yet further preferably from 10,000 to 40,000.

The acid value of the polymeric dispersant is preferably not more than 100 mgKOH/g, in view of achieving excellent coagulation properties when contacting with the treatment liquid. The acid value is more preferably from 25 mgKOH/g to 100 mgKOH/g, still more preferably from 25 mgKOH/g to 80 mgKOH/g, and particularly preferably from 30 mgKOH/g to 65 mgKOH/g. When the acid value of the polymeric dispersant is 25 mgKOH/g or higher, the stability of the self-dispersing properties is satisfactory.

The polymeric dispersant preferably includes a polymer having a carboxyl group, more preferably a polymer having a carboxyl group and having an acid value of from 25 mgKOH/g to 80 mgKOH/g, from the viewpoint of the coagulation speed at the time the self-dispersing polymer contacts with the treatment liquid.

The mixing ratio by mass of pigment (p) to dispersant (s) (p:s) is preferably in a range of from 1:0.06 to 1:3, more preferably in a range of from 1:0.125 to 1:2, and still more preferably in a range of from 1:0.125 to 1:1.5.

In the invention, when a dye is used as a colorant, a dye retained on a water-insoluble carrier may be used as a water-insoluble color particle. The dye may be selected from known dyes without particular restrictions, and the dyes described in, for example, JP-A Nos. 2001-115066, 2001-335714, and 2002-249677 may be used suitably in the invention. The carrier is not particularly limited as long as the carrier is insoluble in water or hardly-soluble in water, and the carrier may be selected from an inorganic material, an organic material, or a composite material thereof. Specifically, the carriers described in, for example, JP-A Nos. 2001-181549 and 2007-169418 may be used suitably in the invention.

The carrier retaining the dye (water-insoluble color particle) may be used in the form of an aqueous dispersion containing a dispersant. As the dispersant, the above-mentioned dispersants may be used suitably.

In the invention, the ink composition preferably includes a pigment and a dispersant, more preferably includes an organic pigment and a polymeric dispersant, and particularly preferably includes an organic pigment and a polymeric dispersant containing carboxyl group, in consideration of the light-fastness, quality, and the like of the image. From the viewpoint of coagulation properties, it is preferable that the pigment is a water-dispersible pigment having a surface at least part of which is covered with a polymeric dispersant, and it is more preferable that the pigment is a water-dispersible pigment having a surface at least part of which is covered with a polymeric dispersant having a carboxyl group. From the viewpoint of coagulation properties, it is preferable that the acid value of the above-described self-dispersing polymer particles is smaller than the acid value of the polymeric dispersant described above.

The average particle diameter of the pigment is preferably from 10 nm to 200 nm, more preferably from 10 nm to 150 nm, and still more preferably from 10 nm to 100 nm. When the average particle diameter is 200 nm or less, color reproducibility is excellent, and ejection properties are excellent when ejecting droplets by an inkjet process. When the average particle diameter is 10 nm or more, light-fastness is excellent. The particle size distribution of the colorant is not particularly limited, and may be a broad particle size distribution or a monodispersed particle size distribution. It is also possible to use a mixture of two or more colorants having monodispersed particle size distributions.

The volume average particle diameter and particle size distribution of the polymer particles are obtained by measuring particle diameters by a dynamic light scattering method, using a Nanotrac particle size distribution measuring instrument UPA-EX150 (tradename, manufactured by NIKKISO Co., Ltd.).

The pigment may be used singly or in combination of two or more thereof. From the viewpoint of image density, the content of pigment in the ink composition is preferably from 1 to 25% by mass, more preferably from 2 to 20% by mass, still more preferably from 4 to 20% by mass, and particularly preferably from 4 to 15% by mass, with respect to the ink composition.

Aqueous Medium

The ink composition used in the invention includes an aqueous medium. The aqueous medium includes water and at least one kind of water-soluble organic solvent. By including the water-soluble organic solvent, effects of drying prevention, moistening, promoting penetration or the like may be obtained. In order to prevent drying, the water-soluble organic solvent may be used as an anti-drying agent for preventing nozzle clogging due to aggregation of ink that has attached and dried at an ink ejection port of an jetting nozzle. From the viewpoint of drying prevention or moistening, a water-soluble organic solvent having a lower vapor pressure than that of water is preferably used. From the viewpoint of promoting penetration, the water-soluble organic solvent may be used as a penetration promoter for promoting penetration of ink into a recording medium.

As an anti-drying agent, the water-soluble organic solvent preferably has a lower vapor pressure than that of water. Examples of such a water-soluble organic solvent include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylol propane; lower alkyl ethers of polyhydric alcohols, such as ethylene glycol monomethyl ether, ethylene glycol monoethyl ether, diethylene glycol monomethyl ether, diethylene glycol monoethyl ether, triethylene glycol monoethyl ether and triethylene glycol monobutyl ether; heterocyclic compounds such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; polyfunctional compounds such as diacetone alcohol and diethanol amime; and urea derivatives. Among these, polyhydric alcohols such as glycerin and diethylene glycol are preferable as anti-drying agents.

The anti-drying agent may be used singly or in combination of two or more thereof. The content of anti-drying agent in the ink composition is preferably from 10 to 50% by mass.

As the penetration promoter, the water-soluble organic solvent is favorably used in order to promote the penetration of ink composition into a recording medium (such as printing paper). Examples of such a water-soluble organic solvent include alcohols such as ethanol, isopropanol, butanol, diethylene glycol monobutyl ether, triethylene glycol monobutyl ether, and 1,2-hexanediol, sodium lauryl sulfate, sodium oleate, and nonionic surfactants.

The penetration promoter may be used singly or in combination of two or more thereof. The content of penetration promoter in the ink composition is preferably from 5 to 30 mass %. The penetration promoter is used preferably at an amount in a range in which image bleeding or print through is not caused.

The water-soluble organic solvent may be used also for adjusting the viscosity. Examples of water-soluble organic solvents that may be used to adjust the viscosity include alcohols such as methanol, ethanol, propanol, isopropanol, butanol, isobutanol, sec-butanol, t-butanol, pentanol, hexanol, cyclohexanol, and benzyl alcohol; polyhydric alcohols such as ethyleneglycol, diethyleneglycol, triethyleneglycol, polyethyeleneglycol, propyleneglycol, dipropyleneglycol, polypropyleneglycol, butyleneglycol, hexanediol, pentanediol, glycerin, hexanetriol, and thiodiglycol; glycol derivatives such as ethyleneglycol monomethyl ether, ethyleneglycol monoethyl ether, ethyeleneglycol monobutyl ether, diethyeleneglycol monomethyl ether, diethyleneglycol monobutyl ether, propyleneglycol monomethyl ether, propyleneglycol monobutyl ether, dipropyleneglycol monomethyl ether, triethyeleneglycol monomethyl ether, ethyleneglycol diacetate, ethyleneglycol monomethyl ether acetate, triethyleneglycol monomethyl ether, triethyleneglycol monoethyl ether, and ethyleneglycol monophenyl ether; amines such as ethanolamine, diethanolamine, triethanolamine, N-methyldiethanolamine, N-ethyldiethanolamine, morpholine, N-ethylmorpholine, ethylene diamine, diethylene triamine, triethylene tetramine, polyethyleneimine and tetramethyl propylene diamine; and other polar solvents such as formamide, N,N-dimethylformamide, N,N-dimethylacetoamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone. Any of these solvents may be used singly or in combination of two or more thereof.

Water

The ink composition includes water, and the content of water in the ink composition is not particularly limited. The content of water in the ink composition is preferably from 10 to 99% by mass, more preferably from 30 to 80% by mass, and still more preferably from 50 to 70% by mass.

(Other Additives)

The ink composition used in the invention may further include other additives than the aforementioned components, such as known additives including an anti-drying agent (moistener), an anti-fading agent, an emulsion stabilizer, a penetration enhancing agent, a UV absorber, an antiseptic agent, an antimildew agent, a pH adjuster, a surface-tension controller, an antifoam agent, a viscosity adjuster, a dispersant, a dispersion stabilizer, an antirust agent and a chelating agent. When these additives are added to the ink composition, they are usually directly added to the ink composition. When a dispersion of an oily dye is used, these additives are usually added to the dispersion after the preparation of the dye dispersion. However, these additives may be added to an oil phase or aqueous phase during the preparation of the dye dispersion.

The use of the UV absorber improves the storability of an image, and examples of the UV absorber include benzotriazole compounds, benzophenone compounds, cinnamic compounds, triazine compounds, compounds described in Research Disclosure No. 24239, and so-called fluorescent brighteners that emit fluorescent light upon absorption of UV rays, such as stilbene compounds and benzoxazole compounds.

The anti-fading agent may be used for improving the storability of an image, and examples thereof include an organic anti-fading agent and a metal complex anti-fading agent. Examples of the organic anti-fading agent include hydroquinones, alkoxyphenols, dialkoxyphenols, phenols, anilines, amines, indanes, chromanes, alkoxyanilines and heterocyclic compounds. Examples of the metal complex anti-fading agent include nickel complexes and zinc complexes.

Examples of the antimildew agent include sodium dehydroacetate, sodium benzoate, sodium pyridinethion-1-oxide, ethyl p-hydroxybenzoate, 1,2-benzoisothiazolin-3-one, and salts thereof. The content of the antimildew agent is preferably from 0.02 to 1.00% by mass with respect to the ink composition.

Examples of the pH adjuster include a neutralizer such as an organic base or an inorganic alkali. The pH adjuster improves the storability of the ink composition. The pH adjuster is preferably added at such an amount that the pH of the ink composition becomes from 6 to 10, more preferably from 7 to 10.

Examples of the surface-tension controller include nonionic surfactants, cationic surfactants, anionic surfactants, and betaine surfactants.

The surface-tension controller is preferably added in such an amount that the surface tension of the ink composition is from 20 to 60 mN/m, more preferably from 20 to 45 mN/m, and further preferably from 25 to 40 mN/m. When the surface-tension controller is added in an amount in the above range, the ink composition can be favorably spotted using an inkjet method.

Examples of the surfactants include, as hydrocarbon surfactants, anionic surfactants such as fatty acid salts, alkyl sulfates, alkyl benzene sulfonates, alkyl naphthalene sulfonates, dialkyl sulfosucciniates, alkyl phosphates, formalin condensates of naphthalene sulfonates, and polyoxyethylene alkyl sulfates; and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkyl amines, glycerin fatty acid esters, and oxyethylene-oxypropylene block copolymers. Further, acetylene-type polyoxyethyleneoxide surfactants, such as SURFYNOL series (trade name, manufactured by Air Products & Chemicals, Inc.) and OLFINE E1010 (tradename, manufactured by Nissin Chemical Industry Co., Ltd.), and amine oxide-type amphoteric surfactants such as N,N-dimethyl-N-alkylamine oxide are also favorably used.

Moreover, compounds described as surfactants in JP-A No. 59-157636, pp. 37 to 38 and Research Disclosure No. 308119 (1989) are also applicable.

The anti-abrasion properties may be improved by using fluoro(fluoroalkyl) surfactants, silicone surfactants or the like, such as those described in JP-A No. 2003-322926, 2004-325707 and 2004-309806.

The aforementioned surface-tension controller may also be used as an antifoam agent, and fluorine-containing compounds, silicone compounds, chelate compounds such as EDTA may be used.

Inkjet Method

In the invention, the ink composition is applied, by an inkjet process, onto a recording medium to which the treatment liquid has been applied. The recording of an image using an inkjet method may be performed by ejecting a liquid composition onto a desired recording medium by application of energy, and the recording medium is, for example, a plain paper or a resin-coated paper, such as paper exclusively for inkjet recording, a film, paper that can be used both for inkjet recording and electrophotographic recording, cloth, glass, a metal, or ceramic, and examples thereof include those described in JP-A Nos. 8-169172, 8-27693, 2-276670, 7-276789, 9-323475, 62-238783, 10-153989, 10-217473, 10-235995, 10-337947, 10-217597, and 10-337947. An inkjet recording method that is preferred in the invention is the method described in paragraphs [0093] to [0105] of JP-A No. 2003-306623.

The inkjet method is not particularly limited and may be any known method such as a charge-control method in which ink is ejected by electrostatic attraction force; a drop-on-demand method (pressure-pulse method) in which a pressure of oscillation of a piezo element is utilized; an acoustic inkjet method in which ink is ejected by radiation pressure generated by irradiation of ink with acoustic beams that have been converted from electric signals; and a thermal inkjet method in which ink is ejected by a pressure generated by formation of bubbles caused by heating of ink (BUBBLEJET, registered trademark).

Further, examples of the inkjet method include a method in which a large number of small-volume droplets of an ink having a low optical density, which is called a photo ink, are ejected; a method in which inks having substantially the same hue but at different densities are used to improve image quality; and a method in which a clear and colorless ink is used.

The inkjet head used in an inkjet method may be either an on-demand type head or a continuous type head. Examples of ejection systems include electromechanical transduction systems (such as a single-cavity system, a double-cavity system, a vendor system, a piston system, a share-mode system and a shared-wall system), electrothermal transduction systems (such as a thermal inkjet system and a BUBBLE-JET (registered trademark) system), electrostatic suction systems (such as an electric-field-control system and a slit-jet system), and discharge systems (such as a spark jet system), and any of these ejection systems is applicable.

The ink nozzles and the like used for the inkjet recording are not particularly limited, and may be selected as appropriate according to applications.

Regarding the inkjet recording head, there are (i) a shuttle system in which recording is performed while a short serial head having a small length is moved in the width direction of a recording medium in a scanning manner, and (ii) a line system in which a line head having recording devices that are aligned correspondingly to the entire length of one side of a recording medium is used. In the line system, image recording can be performed over the whole of one surface of a recording medium by moving the recording medium in a direction orthogonal to the direction along which the recording devices are aligned, and a conveyance system, such as carriage, which moves the short head in a scanning manner is unnecessary. Since a complicated scan-movement control of the movement of the carriage and the recording medium is unnecessary and only the recording medium is moved, the recording speed can be increased compared to the shuttle system. The inkjet recording method of the invention can be applied to both of these systems; effects in improving the ejection accuracy and abrasion resistance of an image are larger when the inkjet recording method of the invention is applied to a line system, in which dummy ejection is generally not performed.

The ink amount per droplet ejected from the inkjet head may be suitably set in accordance with the desired coloring density and resolution, and is not particularly limited. The ink amount per droplet is preferably from 0.5 pl to 40 pl, more preferably from 1 pl to 30 pl, and still more preferably from 1.5 pl to 20 pl, from the viewpoint of obtaining both of high resolution and a favorable coloring density at a high density region.

An ink droplet amount of 0.5 pl or less results in an improved coloring density. An ink droplet amount of 40 pl or less facilitates control of ink spotting accuracy and enables formation of a high-resolution image with higher uniformity.

In the invention, it is preferable to adjust the ink droplet amount depending on the image to be recorded. For example, recording of a high-density and high-concentration image (such as a solid image) is preferably performed at an ink droplet amount of from 1.5 pl to 40 pl, more preferably from 1.5 pl to 10 pl.

Since the treatment liquid and the ink composition are used in the inkjet recording method of the invention, the inkjet recording method of the invention is suitable as a method of recording an image having a particularly high resolution. When fine image recording, in which a higher resolution is preferred, is performed, the image recording is preferably performed at an ink droplet amount of from 0.5 pl to 10 pl, more preferably from 1 pl to 8 pl, and still more preferably from 1.5 pl to 6 pl.

In the inkjet recording method of the invention, the total application amount of the ink composition may be suitably set in accordance with the image to be recorded and the like. The total application amount of the ink composition is preferably from 5 $ml/m^2$ to 30 $ml/m^2$, more preferably from 8 $ml/m^2$ to 15 $ml/m^2$, and particularly preferably from 10 $ml/m^2$ to 13 $ml/m^2$. A total application amount of 5 $ml/m^2$ or more broadens the color reproduction range, whereby an image with excellent color reproduction properties can be recorded. A total application amount of 30 $ml/m^2$ or less decreases the energy required for removing water contained in the ink composition, and is preferable from the viewpoints of machine structure and decreased environmental load.

Recording Medium

According to the inkjet recording method of the invention, an image is recorded on a recording medium. The recording medium is not particularly limited, and may be a cellulose-based general printing paper, such as high-quality paper, coat paper, or art paper, which is used for general offset printing and the like. When image recording is performed on the cellulose-based general printing paper by a general inkjet method using an aqueous ink, absorption and drying of the ink is relatively slow, colorant migration easily occurs after ink spotting, and image quality tends to lower. In contrast, according to the inkjet recording method of the invention, recording of a high-quality image having excellent color density and hue is achieved while suppressing the migration of the colorant.

The recording medium may be a commercially-available product, and examples thereof include high-quality papers (A) such as PRINCE WOOD FREE (tradename) manufactured by Oji Paper Co., Ltd., SHIRAOI (tradename) manufactured by Nippon Paper Industries Co., Ltd., and *New NPI jo-shitsu* (New NPI high-quality; tradename) manufactured by Nippon Paper Industries Co., Ltd.; very light-weight coated papers such as EVER LIGHT COATED (tradename) manufactured by Oji Paper Co., Ltd. and AURORA S (tradename) manufactured by Nippon Paper Industries Co., Ltd.; lightweight coat papers (A3) such as TOPKOTE (L) (tradename) manufactured by Oji Paper Co., Ltd. and AURORA L (tradename) manufactured by Nippon Paper Industries Co., Ltd.; coat papers (A2, B2) such as TOPKOTE PLUS (tradename) manufactured by Oji Paper Co., Ltd. and AURORA COAT (tradename) manufactured by Nippon Paper Industries Co., Ltd.; and art papers (A1) such as 2/SIDE GOLDEN CASK GLOSS (tradename) manufactured by Oji Paper Co., Ltd. and TOKUBISHI ART (tradename) manufactured by Mitsubishi Paper Mills Ltd. As the recording medium, various inkjet-recording papers exclusively for photos may be used.

Among the recording media, coated paper, which is used for general offset printing, is preferable. The coated paper is produced generally by coating a surface of cellulose-based paper (such as high-quality paper or neutral paper), which has not been subjected to surface treatment, with a coating material so as to form a coating layer. When image forming is performed by usual water-based inkjet, the coated paper tends to produce problems in quality, for example in image gloss or abrasion resistance. However, unevenness in gloss is suppressed and an image having excellent gloss and abrasion resistance can be obtained according to the inkjet recording method of the invention even when the coated paper is used. In particular, it is preferable to use a coated paper having base paper and a coated layer including an inorganic pigment, and it is more preferable to use a coated paper having base paper and a coated layer including kaolin and/or calcium bicarbonate. Specifically, art paper, coat paper, lightweight coat paper, or very light-weight coat paper is preferable.

Fixing Process

The inkjet recording method of the invention preferably includes, after the ink application process, a fixing process of applying heat and pressure to the ink image, which is formed by the application of the ink composition, by contacting a heating surface of a heating member. As a result of the application of heat and pressure, the image on the recording medium is fixed, thereby further improving the resistance of the image against abrasion.

The heating is preferably performed at a temperature that is not lower than the glass transition temperature (Tg) of the self-dispersing polymer particles contained in the image. The heating to Tg of higher results in formation of a film and strengthen the image. The heating temperature is preferably within a temperature range that is not lower than Tg+10° C. Specifically, the heating temperature is preferably within a range of from 40° C. to 150° C., more preferably from 50° C. to 100° C., and still more preferably from 60° C. to 90° C.

When applying heat and pressure, the pressure is preferably in a range of from 0.1 MPa to 3.0 MPa, more preferably from 0.1 MPa to 1.0 MPa, and still more preferably from 0.1 MPa to 0.5 MPa, from the viewpoint of smoothing the ink image surface.

The method of applying heat (heating) is not particularly limited, and preferable examples thereof include a noncontact heating method, such as a method of heating with a heat generator such as a NICHROME wire, a method of supplying warm or hot air, or a method of heating with a halogen lamp or an infrared lamp. The method of applying heat and pressure is not particularly limited, and preferable examples thereof include a contact heating and fixing method, such as a method of pressing a hot plate against an image-formed surface of the recording medium, a method in which a heat-pressurization apparatus is used to perform contact heat-fixing by passing the recording medium through a pressure contact portion, wherein the heat-pressurization apparatus may have a pair of heat-pressurization rollers or a pair of heat-pressurization belts, or may have a heat-pressurization belt disposed at the image-recorded surface of the recording medium and a support roller disposed at the opposite side of the recording medium.

When applying heat and pressure, the nip time is preferably from 1 msec to 10 sec, more preferably from 2 msec to 1 sec, and still more preferably from 4 msec to 100 msec. The nip width is preferably from 0.1 mm to 100 mm, more preferably from 0.5 mm to 50 mm, and still more preferably from 1 mm to 10 mm.

The heat-pressurization roller may be a metal roller made of a metal, or a roller having a metal core of which outer surface is covered with a coating layer made of an elastic material and, optionally, a surface layer (also referred to as a release layer). The metal core may be a cylindrical body made of iron, aluminum, or SUS (stainless steel). It is preferable that at least a part of the surface of the metal core is coated with a coating layer. The coating layer is preferably formed by a silicone resin or fluororesin, each of which has release properties. It is preferable that a heat generator is built into the interior of the metal core of one of the heat-pressurization rollers. A heat treatment and a pressurization treatment may be performed simultaneously by passing the recording medium between the rollers. In an embodiment, the recording medium is heated by being nipped between two heating rollers, if necessary. Preferable examples of the heat generator include a halogen lamp heater, a ceramic heater, and a NICHROME wire.

The belt substrate of a heat-pressurization belt used in a heat-pressurization apparatus is preferably a seamless nickel electric brass, and the thickness of the substrate is preferably from 10 μm to 100 μm. Examples of the material of the belt substrate include, in addition to nickel, aluminum, iron and polyethylene. When a silicone resin or a fluororesin is applied, the thickness of the layer formed by the resin is preferably from 1 μm to 50 μm, and more preferably from 10 μm to 30 μm.

In order to obtain a pressure (nip pressure) within the above range, elastic members that exhibit tension, such as a spring, may be selected and disposed at both ends of the roller (for example, a heat-pressurization roller), such that a desired nip pressure is obtained in consideration of the nip gap.

The conveyance speed of the recording medium when using a heat-pressurization roller or a heat-pressurization belt is preferably from 200 mm/sec to 700 mm/sec, more preferably from 300 mm/sec to 650 mm/sec, and still more preferably from 400 mm/sec to 600 mm/sec.

Inkjet Print

The inkjet print of the invention is a print on which an image has been recorded by using the inkjet recording method of the invention. Therefore, even when the inkjet print is obtained by high-speed recording, generation of crepey unevenness is suppressed, and the inkjet print has high resolution and excellent abrasion resistance.

EXAMPLES

The present invention is specifically described with reference to Examples below. However, the invention is not limited thereto. Unless otherwise indicated, “part” and “%” are based on mass.

Preparation of Ink Composition

Preparation of cyan inks C1 to C6

Preparation of Cyan Dispersion Liquid

A mixture solution was prepared by adding 6 parts of styrene, 11 parts of stearyl methacrylate, 4 parts of styrene macromer AS-6 (tradename, manufactured by To a Gosei Co, Ltd.), 5 parts of BLEMMER PP-500 (tradename, manufactured by NOF Corporation), 5 parts of methacrylic acid, 0.05 parts of 2-mercaptoethanol, and 24 parts of methyl ethyl ketone into a reaction container.

Separately, another mixed solution was prepared by adding 14 parts of styrene, 24 parts of stearyl methacrylate, 9 parts of styrene macromer AS-6 (tradename, manufactured by To a Gosei Co., Ltd.), and 9 parts of BLEMMER PP-500 (tradename, manufactured by NOF Corporation), 10 parts of methacrylic acid, 0.13 parts of 2-mercaptoethanol, 56 parts of methyl ethyl ketone, and 2.4 parts of 2,2'-azobis(2,4-dimethylvaleronitrile) into a dripping funnel.

Further, the temperature of the mixed solution in the reaction container was increased to 75° C. under nitrogen atmosphere while stirring, and the mixed solution in the dripping funnel was gradually dripped into the reaction container over 1 hour. When two hours have elapsed from the completion of the dripping, a solution of 1.2 parts of 2,2'-axobis(2,4-dimethylvaleronitrile) dissolved in 12 parts of methyl ethyl ketone was dripped into the reaction container over 3 hours, and the contents of the reaction container were further ripened at 75° C. for 2 hours and then at 80° C. for 2 hours, as a result of which a polymeric dispersant solution was obtained.

A part of the obtained polymeric dispersant solution was isolated by removing solvent. The obtained solid was diluted with tetrahydrofuran to a concentration of 0.1% by mass, and the weight average molecular weight thereof was measured with a high-speed GPC (gel permeation chromatography) HLC-8220GPC (tradename, manufactured by Tosoh Corporation) using three serially-connected columns of TSKGEL SUPERHZM-H, TSKGEL SUPERHZ4000, and TSKGEL SUPERHZ2000 (tradenames, all manufactured by Tosoh Corporation). As a result, the weight average molecular weight was found to be 25,000 in terms of polystyrene-equivalent value. The acid value was found to be 80 mgKOH/g.

The polymeric dispersant solution in an amount that corresponds to a solid content of 5.0 g, 10.0 g of a cyan pigment Pigment Blue 15:3 (manufactured by Dainichiseika Color and Chemicals Mfg. Co., Ltd.), 40.0 g of methyl ethyl ketone, 8.0 g of 1 mol/L (litter, the same applies hereinafter) sodium hydroxide aqueous solution, and 82.0 g of ion exchange water were supplied, together with 300 g of 0.1 mm zirconia beads, to a vessel, and the contents of the vessel were dispersed using a ready mill disperser (manufactured by Aimex Co., Ltd.) at 1,000 rpm for 6 hours. The obtained dispersion liquid was concentrated under reduced pressure using an evaporator until the methyl ethyl ketone was sufficiently removed, and further concentrated to a pigment concentration of 10%, as a result of which a cyan dispersion liquid C in which a water-dispersible pigment was dispersed was obtained.

The volume average particle diameter (of secondary particles) of the obtained cyan pigment dispersion liquid C was measured according to a dynamic light scattering method using a Nanotrac particle size distribution measuring instrument UPA-EX150 (tradename, manufactured by Nikkiso Co., Ltd.), as a result of which the volume average particle diameter was found to be 77 nm.

Synthesis of Self-Dispersing Polymer Particles B 360.0 g of methyl ethyl ketone was placed in a 2 L three-necked flask equipped with a stirrer, a thermometer, a reflux condenser, and a nitrogen gas introduction tube, and the temperature of the methyl ethyl ketone was increased to 75° C. under nitrogen atmosphere. Thereafter, a mixed solution of 180.0 g of phenoxyethyl acrylate, 162.0 g of methyl methacrylate, 18.0 g of acrylic acid, 72 g of methyl ethyl ketone, and 1.44 g of an azo polymerization initiator V-601 (tradename, manufactured by Wako Pure Chemical Industries Co., Ltd.) was dripped into the flask at a constant rate while maintaining the temperature inside the flask at 75° C., such that the dripping was completed in 2 hours. After the completion of the dripping, a solution of 0.72 g of V-601 (tradename, manufactured by Wako Pure Chemical Industries Co., Ltd.) in 36.0 g of methyl ethyl ketone was added thereto, and the contents of the flask were stirred for 2 hours while maintaining the liquid temperature at 75° C. Thereafter, a solution of 0.72 g of V-601 (tradename, manufactured by Wako Pure Chemical Industries Co., Ltd.) in 36.0 g of isopropanol was added thereto, and the contents of the flask were stirred for 2 hours while maintaining the liquid temperature at 75° C. Then, the liquid temperature was increased to 85° C., and stirring was further continued for 2 hours, as a result of which a resin solution of a copolymer of phenoxyethyl acrylate/methyl methacrylate/acrylic acid (at a ratio by mass of 50/45/5) was obtained.

The weight average molecular weight (Mw) of the obtained copolymer as measured in a manner similar to the above was 64,000 (determined as a polystyrene-equivalent value using a gel permeation chromatography (GPC)). The acid value measured according to the method defined in JIS K0070:1992, which is incorporated herein by reference, was 39.0 mgKOH/g.

Subsequently, 668.3 g of the obtained resin solution was weighed out, 388.3 g of isopropanol and 145.7 ml of 1 mol/L sodium hydroxide aqueous solution were added thereto, and the temperature inside the reaction container was increased to 80° C. Then, 720.1 g of distilled water was dripped at a rate of 20 ml/min, thereby forming a water dispersion. Under the atmospheric pressure, the temperature inside the reaction container was maintained at 80° C. for 2 hours, then 85° C. for 2 hours, and then 90° C. for 2 hours. Thereafter, the pressure inside the reaction container was decreased below the atmospheric pressure, thereby removing isopropanol, methyl ethyl ketone, and distilled water at a total amount of 913.7 g. As a result, a water dispersion of self-dispersing polymer particles B having a solid concentration of 28.0% by mass was obtained.

Synthesis of Self-dispersing Polymer Particles A and C to F

Self-dispersing polymer particles A and C to F were synthesized in the same manner as the synthesis of self-dispersing polymer particles B, except for changing the usage amounts of the monomers in accordance with the monomer compositions shown in Table 1 below. Water dispersions of self-dispersing polymer particles A and C to F were prepared using the obtained self-dispersing polymer particles A and C to F, respectively. The monomer compositions described in Table 1 are based on mass.

TABLE 1

| Self-dispersing polymer particles | Methyl meth-acylate | Phenoxyethyl meth-acrylate | Meth-acrylic acid | Acid value (mgKOH/g) |
|---|---|---|---|---|
| A | 47 | 50 | 3 | 23.4 |
| B | 45 | 50 | 5 | 39.0 |
| C | 44 | 50 | 6 | 46.8 |
| D | 42 | 50 | 8 | 62.4 |
| E | 40 | 50 | 10 | 78.0 |
| F | 38 | 50 | 12 | 93.6 |

* The numbers in Table 1 other than acid values indicate percentages.

Preparation of Cyan Ink C2

After cyan dispersion liquid C was prepared as described above, the water dispersion of self-dispersing polymer particles B, a water-soluble organic solvent, a surfactant, and ion exchange water were mixed therewith to provide the following composition. Then, coarse particles were removed by filtering through a 5 μm filter, as a result of which cyan ink C2 was obtained.

| Composition of Cyan Ink C2 | |
|---|---|
| The cyan pigment (Pigment Blue 15:3 (manufactured by Dainichiseika Color and Chemicals Mfg. Co., Ltd.): | 4% |
| The polymeric dispersant (in terms of solid amount): | 2% |
| The water dispersion of self-dispersing polymer particles B (in terms of solid amount): | 4% |
| SANNIX (NEWPOL) GP250 (water-soluble organic solvent) (tradename, manufactured by Sanyo Chemical Industries Ltd.): | 10% |
| Diethyleneglycol monoethyl ether (DEGmEE, water-soluble organic solvent manufactured by Wako Pure Chemical Industries Ltd.): | 5% |
| OLFINE E1010 (tradename, manufactured by Nissin Chemical Industry Co., Ltd.): | 1% |
| Ion exchange water: | 74% |

Preparation of Cyan Ink C1 and C3 to C6

Cyan inks C1 and C3 to C6 were prepared in the same manner as in the preparation of cyan ink C2, except that the water dispersion of self-dispersing polymer particles B was replaced by water dispersions of self-dispersing polymer particles A and C to F, respectively.

Preparation of Cyan Ink C7

Cyan ink C7 was prepared in the same manner as in the preparation of cyan ink C2, except that the water dispersion of self-dispersing polymer particles B was replaced by ion exchange water.

Preparation of Magenta Inks M1 to M6

Preparation of Magenta Dispersion Liquid

Magenta pigment dispersion liquid M was prepared in the same manner as the preparation of the cyan pigment dispersion liquid, except that the cyan pigment Pigment Blue 15:3 (manufactured by Dainichiseika Color and Chemicals Mfg. Co., Ltd.) was replaced by a magenta pigment Chromophtal Jet Magenta DMQ.

Preparation of Magenta Ink M2

After magenta dispersion liquid M was prepared as described above, the water dispersion of self-dispersing polymer particles B, a water-soluble organic solvent, a surfactant, and ion exchange water were mixed therewith to provide the following composition. Then, coarse particles were removed by filtering through a 5 μm filter, as a result of which magenta ink M2 was obtained.

| Composition of Magenta Ink M2 | |
|---|---|
| The magenta pigment (Chromophtal Jet Magenta DMQ): | 4% |
| The polymeric dispersant (in terms of solid amount): | 2% |
| The water dispersion of self-dispersing polymer particles B (in terms of solid amount): | 4% |
| SANNIX (NEWPOL) GP250 (water-soluble organic solvent) (tradename, manufactured by Sanyo Chemical Industries Ltd.): | 10% |
| Diethyleneglycol monoethyl ether (DEGmEE, water-soluble organic solvent manufactured by Wako Pure Chemical Industries Ltd.): | 5% |
| OLFINE E1010 (tradename, manufactured by Nissin Chemical Industry Co., Ltd.): | 1% |
| Ion exchange water: | 74% |

Preparation of Magenta Inks M1 and M3 to M6

Magenta inks M1 and M3 to M6 were prepared in the same manner as in the preparation of magenta ink M2, except that the water dispersion of self-dispersing polymer particles B was replaced by water dispersions of self-dispersing polymer particles A and C to F, respectively.

Preparation of Magenta Ink M7

Magenta ink M7 was prepared in the same manner as in the preparation of magenta ink M2, except that the water dispersion of self-dispersing polymer particles B was replaced by ion exchange water.

Preparation of Treatment Liquid

A treatment liquid was prepared by mixing the ingredients of the treatment liquid composition described below. The treatment liquid exhibited a viscosity of 2.5 mPa·s, a surface tension of 43 mN/m, and a pH (25±1° C.) of 1.0.

Here, the viscosity was measured at 20° C. using a VISCOMETER TV-22 (tradename, manufactured by TOKI SANGYO CO., LTD.). The surface tension was measured at 25° C. using an automatic surface tensiometer CBVP-Z (tradename, manufactured by Kyowa Interface Science Co., Ltd.).

| Composition of Treatment Liquid | |
|---|---|
| Malonic acid (manufactured by Wako Pure Chemical Industries Ltd.; $pKa_1$ = 2.6): | 25% |
| Diethyleneglycol monoethyl ether (DEGmEE, manufactured by Wako Pure Chemical Industries Ltd.): | 20% |
| Ion exchange water: | 55% |

Image Recording and Evaluation

Image Recording

Two 1200 dpi full-line heads each having a width of 10 inches (driving frequency: 25 kHz) were prepared. A cyan ink obtained above was filled into a reservoir tank connected to one of the heads, and a magenta ink obtained above was filled into another reservoir tank connected to the other one of the heads. The respective full-line heads each extending in the main scanning direction are configured to eject inks of respective colors in a single-pass manner, thereby recording an image.

As the recording medium, U-LITE (having a basis weight of 84.9 g/$m^2$, (tradename, manufactured by Nippon Paper Industries Co., Ltd.)) was prepared, and was fixed to a conveyance device that can be moved in a predetermined linear direction at up to 500 mm/sec.

The treatment liquid obtained above was coated on the recording medium at a predetermined coating speed using a roller coating apparatus such that the coating amount of the acidic compound (malonic acid) in the treatment liquid became 0.5 g/$m^2$, and warm air at 70° C. was blown immediately after the coating to dry the recording medium for 2 seconds.

Here, the roller coating apparatus used was an apparatus that was manufactured by reference to the offset gravure coater method described in Coating (edited by "Coating" Editorial Committee of Converting Technical Institute), chapter V, p. 232.

Thereafter, the cyan ink and the magenta ink were ejected in a line printing process at ejection conditions of an ink droplet amount of 2.0 pL, an ejection frequency of 25 kHz, and a resolution of 1200 dpi while moving the recording medium in the sub-scanning direction at a constant speed, thereby recording half-tone images having a secondary color formed by the cyan ink and the magenta ink and having dot percentages of 10%, 50%, and 70%, respectively. Similarly, a solid image of the secondary color formed by the cyan ink and the magenta ink was recorded.

Immediately after recording, the recording medium was dried at 120° C. for 15 seconds, and made to pass between a pair of fixing rollers (made of a PFA resin) having a regulated temperature of 80° C., thereby applying heat and pressure (fixing process) at a nip pressure of 1 MPa. This process of applying heat and pressure was repeated three times to fix the image, as a result of which a print sample was prepared.

The coating speed of the treatment liquid used for recording the images, and the combination of the inks are shown in Table 2.

Evaluation

1. Crepey Unevenness

The half-tone image of the secondary color on the print sample obtained above was observed with the naked eyes, and evaluated according to the following evaluation criteria.

Evaluation Criteria

A: Image density unevenness was not observed.

B: Slight image density unevenness was observed in the half-tone image having a dot percentage of 70%

C: Slight image density unevenness was observed in the half-tone images having dot percentages of 50% and 70%

D: Severe image density unevenness at a pitch of from 2 to 3 mm was observed in each of the half-tone images having dot percentages of 10%, 50%, and 70%.

2. Abrasion Resistance

An A5-sized print sample on which the solid image of the secondary color had been formed was left to stand in an environment of 25° C. and 50% RH for 72 hours. Thereafter, another sheet of U-LITE on which an image had not been formed (hereinafter referred to as "unused sample" in the present evaluation) was superposed on the surface of the solid image on the print sample, and rubbed thereagainst ten strokes with a load of 200 kg/$m^2$. Subsequently, the unused sample and the solid image were observed with the naked eyes, and were evaluated according to the following criteria.

Evaluation Criteria

A: Coloring of the unused sample was not observed, and deterioration of the rubbed solid image was not observed, either.

B: Coloring of the unused sample was observed, and deterioration of the rubbed solid image was also observed.

TABLE 2

| Combination of Ink Compositions | Self-dispersing Polymer Particles | Acid Value (mgKOH/g) | Treatment Liquid Coating Speed (mm/sec.) | Crepey Unevenness | Abrasion Resistance | Remarks |
|---|---|---|---|---|---|---|
| C1/M1 | A | 23.4 | 100 | — | — | Comp. Ex. |
| C2/M2 | B | 39.0 | 100 | A | A | Comp. Ex. |
| C3/M3 | C | 46.8 | 100 | A | A | Comp. Ex. |
| C4/M4 | D | 62.4 | 100 | A | A | Comp. Ex. |
| C5/M5 | E | 78.0 | 100 | A | A | Comp. Ex. |
| C6/M6 | F | 93.6 | 100 | A | A | Comp. Ex. |
| C1/M1 | A | 23.4 | 300 | — | — | Comp. Ex. |
| C2/M2 | B | 39.0 | 300 | B | A | Example |
| C3/M3 | C | 46.8 | 300 | B | A | Example |
| C4/M4 | D | 62.4 | 300 | B | A | Example |
| C5/M5 | E | 78.0 | 300 | C | A | Example |
| C6/M6 | F | 93.6 | 300 | D | A | Comp. Ex. |

TABLE 2-continued

| Combination of Ink Compositions | Self-dispersing Polymer Particles | Acid Value (mgKOH/g) | Treatment Liquid Coating Speed (mm/sec.) | Crepey Unevenness | Abrasion Resistance | Remarks |
|---|---|---|---|---|---|---|
| C1/M1 | A | 23.4 | 500 | — | — | Comp. Ex. |
| C2/M2 | B | 39.0 | 500 | B | A | Example |
| C3/M3 | C | 46.8 | 500 | B | A | Example |
| C4/M4 | D | 62.4 | 500 | B | A | Example |
| C5/M5 | E | 78.0 | 500 | C | A | Example |
| C6/M6 | F | 93.6 | 500 | D | A | Comp. Ex. |
| C7/M7 | — | — | 500 | D | B | Comp. Ex. |

When inks containing self-dispersing polymer particles A with a low acid value were used, ejection failure of ink occurred, and an image capable of evaluation could not be obtained. It is also understood from Table 2 that occurrence of crepey unevenness was suppressed by the inkjet image recording method of the present invention even when printing was performed at high speed.

All publications, patent applications, and technical standards mentioned in this specification are herein incorporated by reference to the same extent as if each individual publication, patent application, or technical standard was specifically and individually indicated to be incorporated by reference.

What is claimed is:

1. An inkjet recording method comprising:

coating a treatment liquid containing an acidic compound on a recording medium by roller coating at a coating speed of 300 mm/sec or higher, wherein coating the treatment liquid includes applying the acidic compound in an amount of from 0.25 to 0.55 g/$m^2$ onto the recording medium and wherein a pH at 25° C. of the treatment liquid is in a range of from 1 to 3; and ejecting an ink composition containing self-dispersing polymer particles having an acid value of from 30 mgKOH/g to 80 mgKOH/g, a pigment, and an aqueous medium, by an inkjet process, onto the recording medium coated with the treatment liquid, thereby recording an image.

2. The inkjet recording method according to claim 1, wherein the self-dispersing polymer particles include a polymer having a carboxyl group.

3. The inkjet recording method according to claim 1, wherein the self-dispersing polymer particles include an acrylic resin that contains a structural unit derived from an acrylate monomer or a methacrylate monomer.

4. The inkjet recording method according to claim 1, wherein the acidic compound is a divalent carboxylic acid.

5. The inkjet recording method according to claim 1, wherein the treatment liquid has a viscosity of from 1 to 30 mPas at 20° C.

6. The inkjet recording method according to claim 1, further comprising, after coating the treatment liquid and before ejecting the ink composition, removing at least a part of a solvent contained in the treatment liquid by drying.

7. The inkjet recording method according to claim 1, further comprising fixing the image by applying heat and pressure to the recording medium on which the ink composition has been applied.

8. The inkjet recording method according to claim 1, wherein the pigment is a water-dispersible pigment, and at least a part of a surface of the water-dispersible pigment is coated with a polymeric dispersant.

9. The inkjet recording method according to claim 8, wherein the polymeric dispersant includes a polymer having a carboxyl group.

10. The inkjet recording method according to claim 8, wherein an acid value of the polymeric dispersant is higher than that of the self-dispersing polymer particles.

11. An inkjet print obtained by recording according to the inkjet recording method of claim 1.

* * * * *